M. KAYTAR.
AUTOMOBILE SLED.
APPLICATION FILED AUG. 24, 1920.

1,366,669.

Patented Jan. 25, 1921.
2 SHEETS—SHEET 1.

INVENTOR
Martin Kaytar
BY
ATTORNEY

M. KAYTAR.
AUTOMOBILE SLED.
APPLICATION FILED AUG. 24, 1920.

1,366,669.

Patented Jan. 25, 1921.
2 SHEETS—SHEET 2.

INVENTOR
Martin Kaytar
BY
ATTORNEY

UNITED STATES PATENT OFFICE.

MARTIN KAYTAR, OF CUPAR, SASKATCHEWAN, CANADA.

AUTOMOBILE SLED.

1,366,669.  Specification of Letters Patent.  Patented Jan. 25, 1921.

Application filed August 24, 1920. Serial No. 405,712.

*To all whom it may concern:*

Be it known that I, MARTIN KAYTAR, subject of Canada, residing at Cupar, in the Province of Saskatchewan, Canada, have invented certain new and useful Improvements in Automobile Sleds, of which the following is a specification.

This invention relates to mechanism intended to be used in connection with self driven vehicles for engaging the road surface, and has for one of its objects, the provision of means operative to propel the vehicle under varying road conditions, when the road gripping devices in ordinary use would be ineffective.

Another object of this invention is the provision of a road engaging unit which can be effectively operated in connection with my mechanism on a slippery road, or on one covered with ice and snow.

A further object of this invention is the provision of means for steering a vehicle on which my improved mechanism has been installed.

For the accomplishment of the aforesaid and other objects, I employ the mechanism shown in its preferred form in the accompanying drawings, in which, Figure 1 is a front view of my invention.

Figure 1:
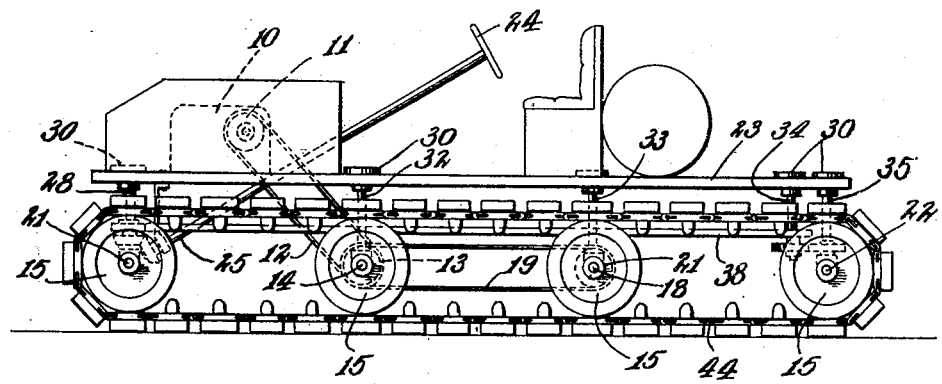
Figure 2:
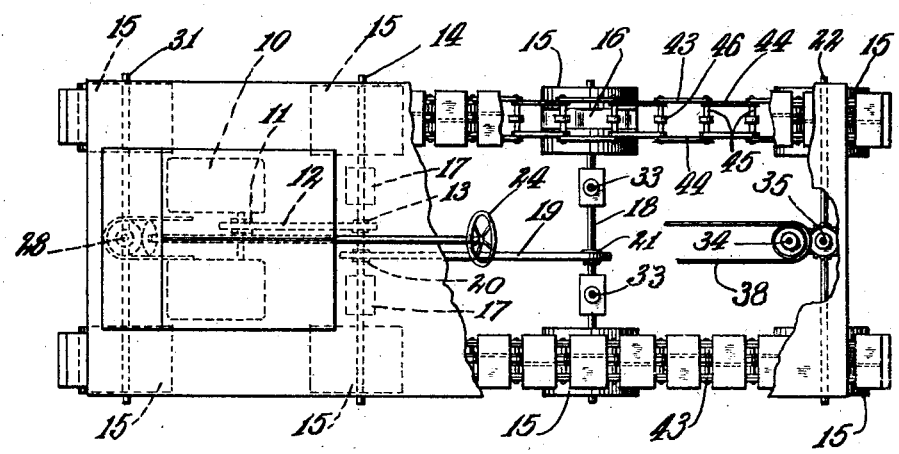
Fig. 2 is a top view of the same, part of the vehicle having been removed to show the underlying parts.

In the practical embodiments of my invention, the vehicle motor 10 is operatively connected to the pulley 11, which drives a pulley 13 on one of the driving shafts 14 by any suitable means as by belt 12. I prefer to use two driving shafts, the second shaft 18 being preferably driven by a belt 19 from pulley 20 on shaft 14, which is suitably supported from the chassis frame 23 by bearings as 17. (Fig. 2.) Front and rear shafts 21 and 22 respectively are preferably not driven through the vehicle motor 10, but are pivotally supported from the chassis frame as will be more fully described hereinafter, all of said shafts 14, 18, 21 and 22 having wheels 15 mounted near the ends thereof for rotation therewith, sprocket teeth 16 being formed in the circumferential surface of said wheels along the middle part thereof.

For steering the vehicle, shafts 21 and 22 are turned bodily about vertical pivots through the operation of steering wheel 24, which is connected to shaft 25, on which bevel gear 26 meshing with bevel gear 27 on vertical shaft 28, is mounted. A bearing block 29 is suitably held in frame 23, a cap 30 being provided for said block, similar bearing blocks and caps being provided for the upper ends of each of vertical shafts 28, 32, 33, 34 and 35. Rotation of steering wheel 24 rotates pulley 36 on shaft 28 through the bevel gears 26 and 27, the motion being transmitted to pulley 37 on shaft 34 by means of belt 38. Gear wheel 39 on shaft 34 meshes with gear wheel 40 on shaft 35, which is secured to a bearing as 41 by a pin 42, shaft 28 being secured to a similar bearing in the same manner, the shafts 21 and 22 passing freely through these bearings, and being prevented from displacement transversely of the vehicle in any well known manner as by fixed collars (not shown) on the shafts on opposite sides of the bearings. It will readily be seen that rotation of the steering wheel causes shafts 21 and 22, through the connections above described, to turn about their vertical pivots 28 and 35 respectively in opposite directions to allow the vehicle to be turned in an arc of short radius.

Figure 3:
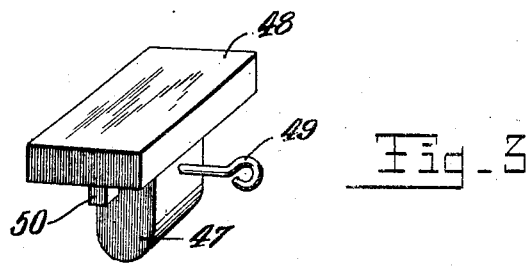
Fig. 3 is a perspective view of one of the road engaging units.
Figure 4:
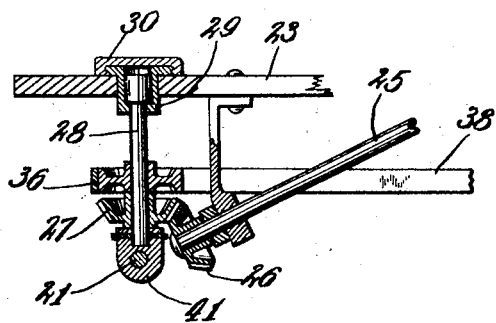
Fig. 4 is a vertical section through the steering mechanism.
Figure 5:
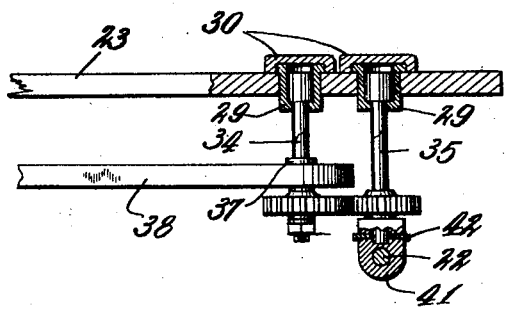
Fig. 5 is a front view and partial section of the rear wheel steering mechanism.
Figure 6:
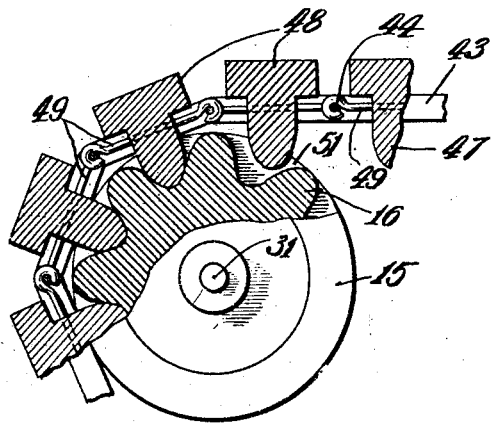
Fig. 6 is a similar view of the driving wheel and of the road engaging means.

Propulsion of the vehicle is effected by means of chains 43 comprising links 44 and pins 45, each of said pins having a space block 46 near the middle thereof. The unit for engaging the road surface is carried by said chains and consists of tooth 47 projecting from the block 48, a hook as 49 being passed through said tooth, the hooks on alternate teeth engaging pins 45 on opposite sides of space block 46. Shoulders 50 (Fig. 3) are provided on the under side of block 48, said shoulders serving to prevent undue transverse movement of the road engaging unit by coming in contact with links 44 when said movement is imminent.

When power is transmitted to driving shafts 14 and 18, the wheels 15 on said shafts are caused to rotate, the teeth 47 of the road engaging units engage the teeth of said wheels said teeth being of less width than that of the wheels and engaging between side flanges 51 formed on the wheel for preventing the disengagement of the units from said wheels. Rotation of wheels 15 also causes them to advance along the lower road engaging units, at the same time carrying the upper part of the chain in the direction in which said wheels advance.

It will be seen that though the road surface is very slippery, sufficient traction is obtained by the use of the series of road engaging units, so that even ice and snow cannot prevent movement of the vehicle. It will also be understood that various changes, such as in the driving mechanism, in the number of shafts and in the steering arrangement may be made without departing materially from the spirit of my invention.

What I claim is:

1. In a vehicle propelling mechanism, a chain comprising spaced side links, pins connecting said links, tread blocks having integral teeth projecting between said pins and spaced side links, said teeth having hooks projecting therefrom whereby they are secured to said pins, and sprocket wheels over which said chains travel, said sprocket wheels being recessed to receive said teeth.

2. In a vehicle propelling mechanism, a chain comprising spaced side links, pins connecting said links, space blocks on said pins near the middle thereof, tread blocks having tread portions projecting across said side links and having integral teeth projecting between said pins and spaced side links, said teeth having hooks projecting therefrom and engaging said pins to secure the tread blocks in position, and sprocket wheels over which said chains travel, said sprocket wheels being recessed to receive the said teeth.

In testimony whereof I have affixed my signature.

MARTIN KAYTAR.